UNITED STATES PATENT OFFICE.

FRANCIS MUDIE SPENCE AND HOWARD SPENCE, OF MANCHESTER, AND REINHOLD OCKEL, OF LOWER WALTON, ENGLAND, ASSIGNORS TO PETER SPENCE & SONS, LIMITED, OF MANCHESTER, ENGLAND.

TREATMENT OF SEWAGE-SLUDGES.

No. 869,272.  Specification of Letters Patent.  Patented Oct. 29, 1907.

Application filed October 28, 1905. Serial No. 284,908.

*To all whom it may concern:*

Be it known that we, FRANCIS MUDIE SPENCE and HOWARD SPENCE, subjects of the King of Great Britain and Ireland, and residents of Manchester, in the county of Lancaster, England, and REINHOLD OCKEL, a subject of the Emperor of Germany and the King of Prussia, and resident of Lower Walton, in the county of Chester, England, have invented new and useful Improvements in the Treatment of Sewage-Sludges and the Like, of which the following is a specification.

This invention relates to the treatment—for the recovery of the fatty and other valuable substances it contains—of (a), the sludge which is precipitated from liquids containing excrementitious and soapy and fatty matters (of which liquids ordinary town sewage is a type) by aluminic sulfate or by ferric sulfate, by alumino-ferric (a crude form of sulfate of alumina) or by other similarly acting precipitant with or without the addition of mineral acid, or of (b), the sludge which deposits from such liquids by sedimentation without the assistance of precipitants, or of (c), a mixture of such sludges.

Sludge deposited or produced as above described contains much water (frequently from 90 to 95 per cent) and it has before now been known to treat such a watery sludge with a mineral acid to facilitate the subsequent recovery of the fatty matters.

According to our present invention we first partially dehydrate the sludge by separating from it by known means as much liquid as is practicable. We effect this, by first curdling the sludge by heat. This result is probably due to the coagulation of the albuminous matter present and which largely assists in compacting the solid matter present. We then, after drawing off the liquid which now separates from it on settlement, still further de-hydrate it by hot pressing it. When operations involving heating are carried out at a sewage or other works which has a town's refuse destructor we may obtain from the destructor the heat which such operations require.

The solidified or largely solidified press cake or other mass yielded by the heat curdling and pressure process we now treat with sufficient mineral acid, preferably sulfuric acid, to dissociate the fatty matters from the bases present.

The addition of the mineral acid to the press cake or its equivalent presents *inter alia* the following material advantages over the addition of acid to the watery sludge as before known. A very much smaller quantity of acid is required to effect the dissociation of the fatty matters from the bases, and the rapid destruction of the filter cloths by the acidified liquid (when the hot pressing or like method is employed) is also avoided.

The acid should be intimately mixed with the cake or mass, as, for example, in a mortar mill, or by other suitable means. The quantity of acid required will depend upon the nature of the material under treatment, but dealing, for example, with the sludge precipitated from ordinary town sewage by alumino ferric and subsequently hot pressed, we have found that from 50 to 75 kilos of sulfuric acid of 66% $SO_3$ to 1000 kilos of press cake or its equivalent containing about 50% to 60% of solid matter is a suitable quantity.

We have found that a similar sludge when treated in the dilute watery condition with acid previous to pressing requires a quantity of from 75 to 125 or even more kilos of sulfuric acid per 1000 kilos of potential press cake contained in such watery sludge. The mixed mass is then prepared for subsequent treatment for the extraction therefrom of the fatty matters by known means, as for example, by drying or partially drying by known means the acid treated press cake or equivalent. The fatty matters are subsequently extracted by means of a suitable solvent. The residue from the extraction process contains valuable fertilizing substances and forms a useful manure.

What we do claim as our invention and desire to secure by Letters Patent is:—

The process of treating sewage sludge or the like for the recovery of fatty or other matters, which consists in precipitating the sludge, curdling the precipitate by heat, dehydrating said precipitate by hot pressing, mixing mineral acid with the press cake, and subsequently suitably preparing such acid treated mass and extracting the fatty matters therefrom by means of a suitable solvent.

In testimony whereof we have signed our names to this specification in the presence of two subscribing witnesses.

FRANCIS MUDIE SPENCE.
HOWARD SPENCE.
REINHOLD OCKEL.

Witnesses:
WM. WARREN,
JAS. STEWART BROADFOOT.

Witnesses to the signature of Reinhold Ockel:
W. H. O. DARLINGTON,
W. C. MARKEL.